United States Patent
Sheu et al.

(10) Patent No.: US 12,406,673 B2
(45) Date of Patent: Sep. 2, 2025

(54) REAL-TIME SPEAKER IDENTIFICATION SYSTEM UTILIZING META LEARNING TO PROCESS SHORT UTTERANCES IN AN OPEN-SET ENVIRONMENT

(71) Applicant: NATIONAL YUNLIN UNIVERSITY OF SCIENCE AND TECHNOLOGY, Yunlin County (TW)

(72) Inventors: Jeng-Shin Sheu, Yunlin County (TW); Cheng-Hsuan Lu, Yunlin County (TW)

(73) Assignee: NATIONAL YUNLIN UNIVERSITY OF SCIENCE, Yunlin County (TW)

(*) Notice: Subject to any disclaimer, the term of this patent is extended or adjusted under 35 U.S.C. 154(b) by 231 days.

(21) Appl. No.: 18/366,979

(22) Filed: Aug. 8, 2023

(65) Prior Publication Data

US 2025/0054499 A1 Feb. 13, 2025

(51) Int. Cl.
*G10L 17/06* (2013.01)
*G10L 17/02* (2013.01)
*G10L 17/04* (2013.01)

(52) U.S. Cl.
CPC .............. *G10L 17/06* (2013.01); *G10L 17/02* (2013.01); *G10L 17/04* (2013.01)

(58) Field of Classification Search
CPC .......... G10L 17/06; G10L 17/02; G10L 17/04
See application file for complete search history.

(56) References Cited

U.S. PATENT DOCUMENTS

| | | | |
|---|---|---|---|
| 2017/0200451 A1* | 7/2017 | Bocklet | G10L 17/08 |
| 2018/0146370 A1* | 5/2018 | Krishnaswamy | H04W 12/06 |
| 2020/0322377 A1* | 10/2020 | Lakhdhar | H04L 29/06 |

FOREIGN PATENT DOCUMENTS

TW 202207209 2/2022

OTHER PUBLICATIONS

Joon Son Chung et al., "In defence of metric learning for speaker recognition", Interspeech Oct. 25-29, 2020, 2020, Shanghai, China, 5 pages.
Jake Snell et al., "Prototypical networks for few-shot learning." 31st Conference on Neural Information Processing Systems, NIPS 2017, Long Beach, CA, USA, 11 pages.

* cited by examiner

*Primary Examiner* — Richemond Dorvil
*Assistant Examiner* — Ethan Daniel Kim
(74) *Attorney, Agent, or Firm* — MUNCY, GEISSLER, OLDS & LOWE, P.C.

(57) ABSTRACT

The invention is a speaker identification system, which is provided to train a speaker model based on a meta-learning approach. Through the training of a plurality of episodes, the speaker model is updated by backpropagating the gradients of a composite objective function comprised of two loss functions and each episode consists of a support set of long utterances and a query set of short utterances. With this single speaker model, the invention converts an input utterance into a speaker embedding vector. This enables the speaker identification system to identify different enrolled speakers solely through the comparison of speaker embedding vectors, effectively blocking spoofing attacks and impostor intrusion. Consequently, the invention is characterized by its lightweight nature, real-time response, suitability for short utterances and open set environments, and can be implemented using low-cost embedded hardware.

6 Claims, 6 Drawing Sheets

REAL-TIME SPEAKER IDENTIFICATION SYSTEM UTILIZING META LEARNING TO PROCESS SHORT UTTERANCES IN AN OPEN-SET ENVIRONMENT

FIELD OF THE INVENTION

The invention relates to a speech technology, and more particularly to a speaker identification system for identifying enrolled speakers and blocking spoofing attacks and impostors.

BACKGROUND OF THE INVENTION

With the increasing number of voice applications, speaker identification technology has become increasingly important for these applications. It needs to authenticate the identity of a speaker who is using it and prevent impersonation stealing in order to meet the requirements of anti-theft and confidentiality.

In speaker identification, an enrolled speaker is referred to as a target speaker, while an unregistered speaker is referred to as an impostor. Attacks using artificially manipulated voices in an attempt to bypass authentication are known as spoofing attacks. These attacks include replay, where pre-recoded utterances of enrolled speakers are played back, and speech synthesis, which refers to artificially generated fake voices using technological methods.

In open-set environments, test utterances are not limited to speech from enrolled speakers. Thus, a speaker identification technology in an open set environment must not only correctly identify a target speaker, but also prevent spoofing attacks and impostor intrusions. For example, "A Speaker Identification Method" was disclosed by Taiwan Patent Publication No. TW 202207209 A, which comprises a three-stage identification. In the first stage of identification, a detection is performed to determine whether a text-dependent test utterance is a spoofing attack. In the second stage of identification, a detection is made for impostor intrusion based on a text-independent test utterance. In the third stage of identification, it is determined whether the text-independent test utterance belongs to one of the enrolled speakers using a speaker identification model. If the text-independent test utterance does not come from an enrolled speaker, it is judged to be from an impostor. The first two stages use different speech features and have their own binary classifiers. In contrast, the third stage utilizes a plurality of classifiers and employs ensemble learning and a unanimity rule, along with a conditional retry mechanism, to determine whether the text-independent test utterance is from a target speaker or an impostor.

However, such a well-known identification method that utilizes many different classifiers has certain drawbacks. Firstly, it requires an obviously long training utterances to build an identification system. Additionally, if the set of enrolled speakers in the system has any change, the classifiers in system need to be re-trained. Moreover, the use of multiple classifiers makes the system challenging to be miniaturized and limits its ability to respond in real-time. Furthermore, it necessitates larger storage space and has a higher computational complexity, making it difficult to implement the system using low-cost embedded hardware.

SUMMARY OF THE INVENTION

The main objective of the invention is to disclose a speaker identification system that is lightweight, capable of providing real-time responses, and suitable for short utterances in open-set environments.

To achieve the aforementioned objectives, the invention is a real-time speaker identification system that utilizes meta learning to process short utterances in open-set environments. The speaker identification system includes a speaker embedding generator, which consists of a Mel-filter bank for extracting acoustic feature vectors and a speaker model. The speaker model converts the acoustic feature vectors of an utterance extracted by the Mel-filter bank into a speaker embedding vector. The speaker model is trained using meta-learning with a plurality of training episodes. Each training episode includes a support set of long utterances and a query set of short utterances. Additionally, the speaker model is trained using a composite objective function that combines two distinct loss functions. This enables the simultaneous learning in both global and local embedding spaces. The gradients of the composite objective function are then backpropagated to update the speaker model, ensuring continuous improvement.

The speaker identification system transforms an input registration utterance of each enrolled speaker into a prototype vector using the speaker embedding generator to complete the enrollment process. Then, the speaker identification system is available for a plurality of test speakers, and the following steps are performed for each test speaker.

A spoofing attack identification step is used to determine whether an input test utterance is a spoofing attack. Unlike conventional methods, the input test utterance here does not have to be a text-dependent utterance. The speaker identification system converts the input test utterance into a speaker embedding vector using the speaker embedding generator. The speaker identification system then calculates the cosine similarity between the speaker embedding vector and the prototype vector of each enrolled speaker in the system. If all cosine similarities exceed a spoofing threshold, the input test utterance is identified as not being a spoofing attack; otherwise, it is immediately rejected for login. Once the input test utterance is accepted in this step, the system proceeds to perform the next step as follows.

An impostor and enrolled speaker identification step is employed to determine whether the input test utterance originates from an impostor or an enrolled speaker. Firstly, the input test utterance is randomly divided into three segments which are continuous parts of the input test utterance. Each segment is then converted to a segment speaker embedding vector using the speaker embedding generator. Subsequently, the speaker identification system calculates similarity scores for each segment speaker embedding vector in relation to the prototype vectors of enrolled speakers in the system. If the highest score obtained for each of the three segments corresponds to the same enrolled speaker, and all similarity scores are greater than an impostor threshold, the input test utterance is identified as belonging to that specific enrolled speaker. However, if the highest scores across the segments do not correspond to the same enrolled speaker, or any of the scores falls below the impostor threshold, the input test utterance is classified as coming from an impostor and is rejected for login.

Through the aforementioned implementation of the invention, it can identify whether an input test utterance is a spoofing attack by comparing it with at least one enrolled speaker. Additionally, it can detect whether the input test utterance is from an impostor by comparing it with at least one enrolled speaker in the system. If the input test utterance is neither a spoofing attack nor an impostor intrusion, the invention can directly identify the specific enrolled speaker to whom the input test utterance belongs. The invention possesses the characteristics of being lightweight, providing real-time response, and being applicable to short utterances and open-set environments. Furthermore, the system can be implemented using low-cost embedded hardware.

DETAILED DESCRIPTION OF THE PREFERRED EMBODIMENTS

The detailed description and technical content of the invention are described below, with reference to the accompanying illustrations.

Figure 1:
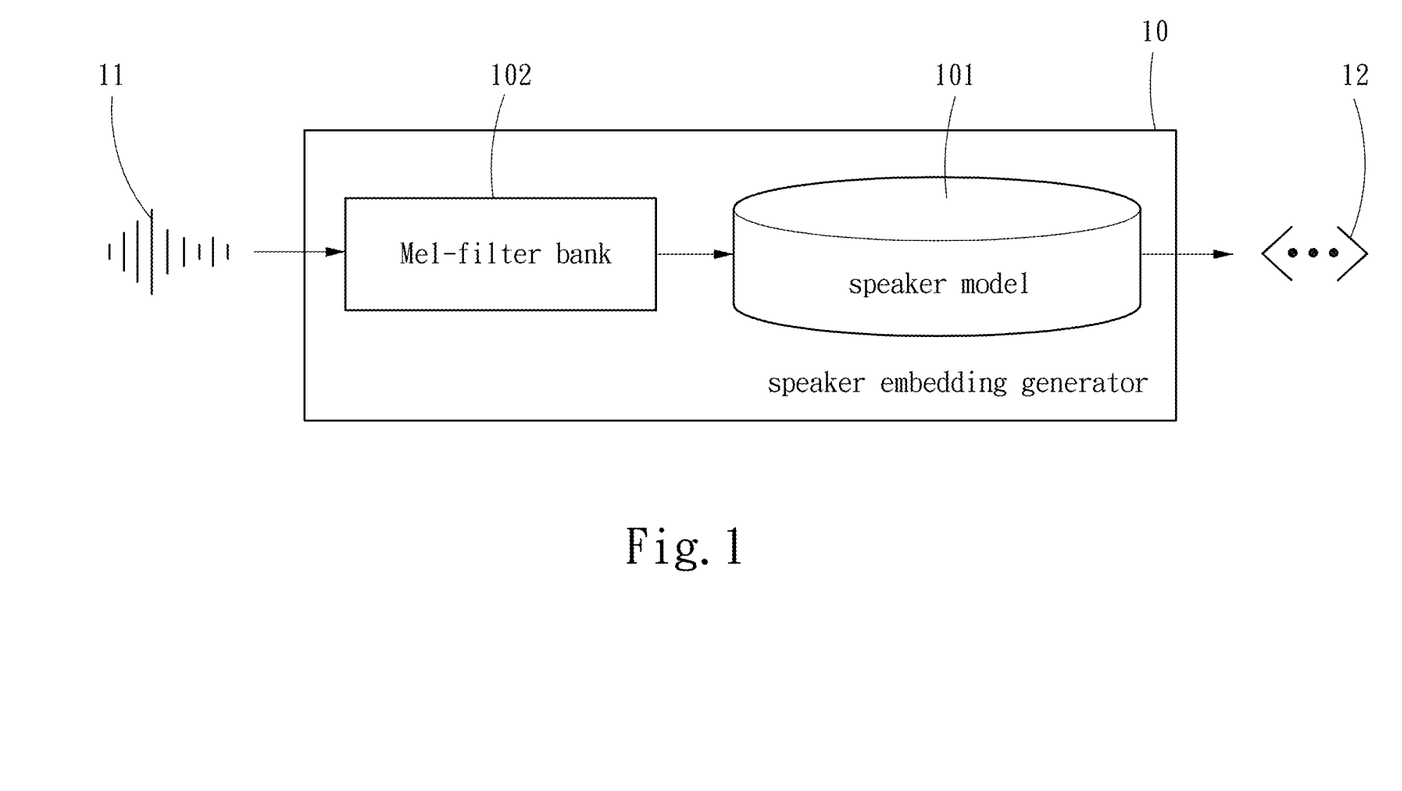
FIG. 1 is a schematic diagram of the operation of the speaker embedding generator of the invention.
Figure 2:
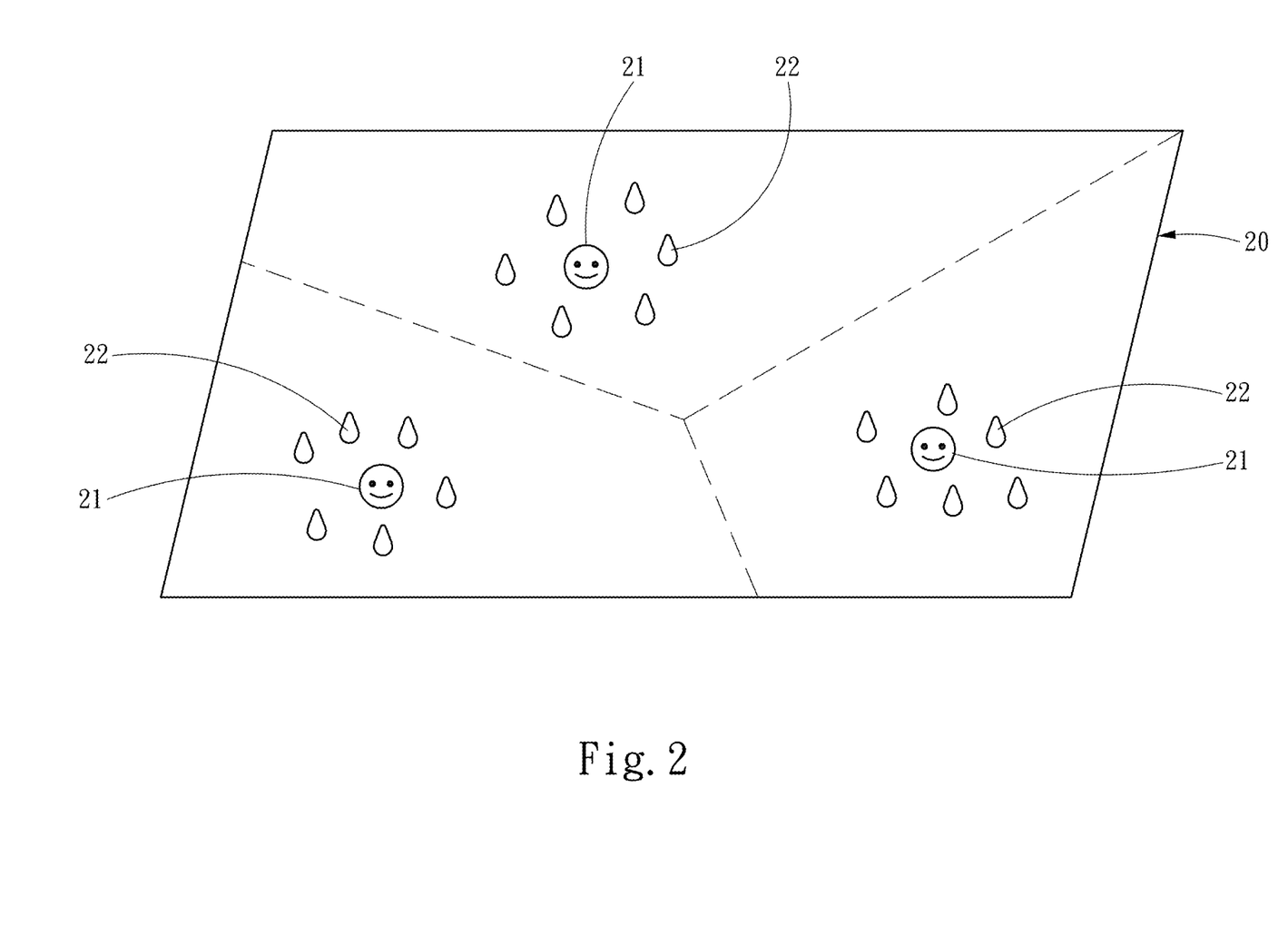
FIG. 2 is a schematic diagram of speaker embedding vectors and prototype vectors in a high-dimensional speaker embedding space of the invention.

Referring to FIG. 1 and FIG. 2, the invention relates to a real-time speaker identification system with short utterances applied to an open-set environment based on meta learning. The speaker identification system comprises a speaker embedding generator 10, which includes a speaker model 101 and a Mel-filter bank 102. The speaker model 101 converts acoustic feature vectors extracted by the Mel-filter bank 102 from an input utterance 11 into speaker embedding vectors 12. The speaker model 101 incorporates an objective function with the following characteristics. In a speaker embedding space 20, the speaker embedding vectors 12 generated by the speaker model 101 for the same speaker are gathered together to form a cluster. Moreover, the clusters of different speakers are well-separated from each other in the speaker embedding space 20.

The speaker model 101 is trained with a plurality of episodes based on meta learning with a composite objective function composed of two loss functions. The gradients of the composite objective function are backpropagated to update the speaker model 101, reducing the loss of the composite objective function. The two loss functions adopted in the composite objective function are angular prototypical loss (Jake Snell et al., "Prototypical networks for few-shot learning," 31st Conference on Neural Information Processing Systems, NIPS 2017, Long Beach, CA, USA.) and softmax loss (Joon Son Chung et al., "In defence of metric learning for speaker recognition", INTERSPEECH 2020 Oct. 25-29, 2020, Shanghai, China). Each of the plurality of episodes includes a support set of long utterances and a query set of short utterances. The speaker model 101 generates a prototype vector 21 for the utterances of each speaker in the support set. Similarly, a speaker embedding vector 22 is generated for the utterances of each speaker in the query set by the speaker model 101. The prototype vector 21 and the speaker embedding vector 22 are located in the high-dimensional speaker embedding space 20. In each training episode, the speaker model 101 utilizes the gradients of the composite objective function to learn not only in local subspaces of the speaker embedding space 20 (via the angular prototypical loss), but also to gain more information from the entire speaker embedding space 20 (via the softmax loss).

Figure 3:
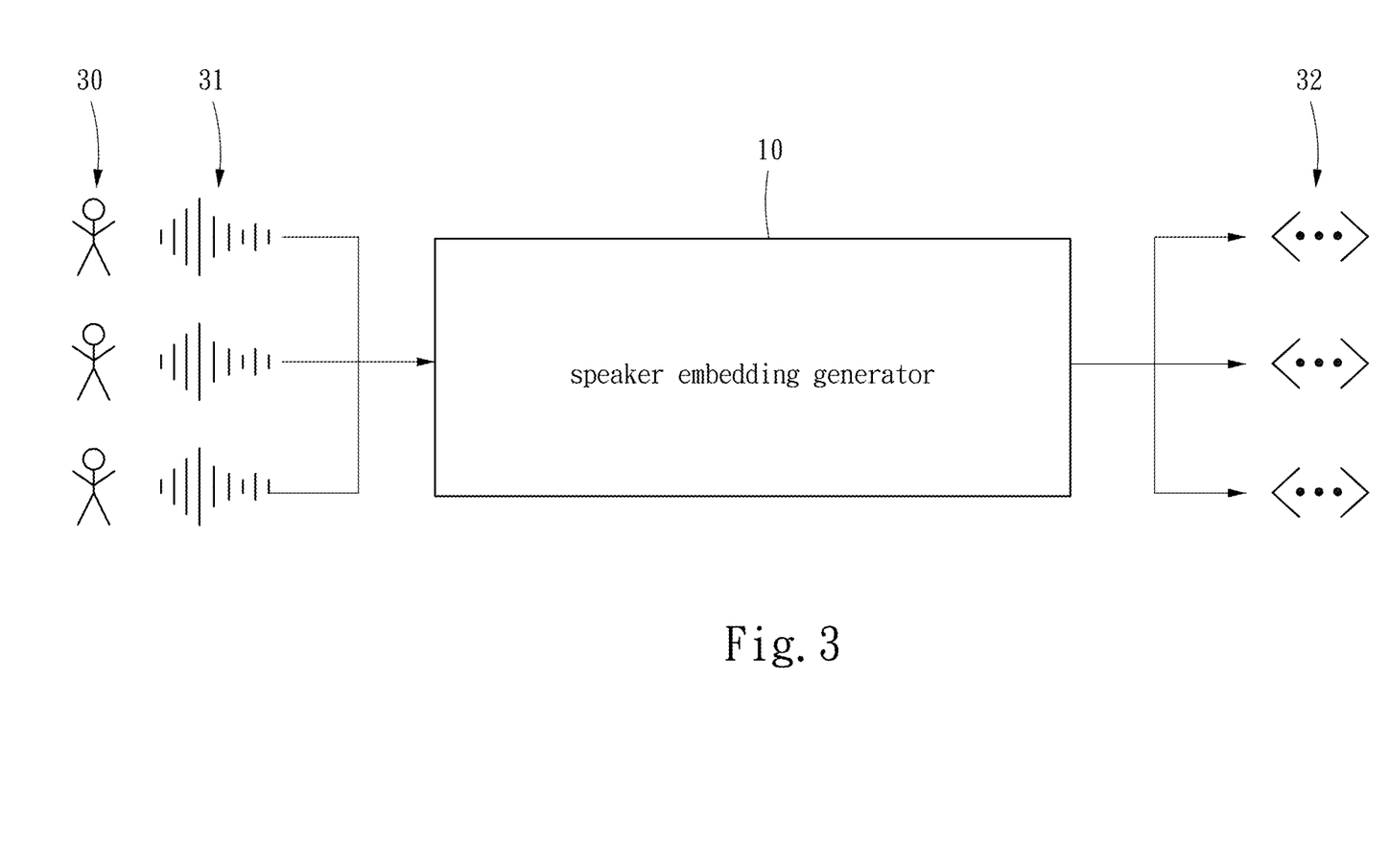
FIG. 3 is a schematic diagram of enrollments for enrolled speakers of the invention.

Also referring to FIG. 3, the speaker identification system converts an input registration utterance 31 of each enrolled speaker 30 into a representative vector 32 corresponding to that enrolled speaker 30 by the speaker embedding generator 10 to complete the enrollment process. Each representative vector 32 is regarded as a prototype vector 21 in the speaker embedding space 20 in FIG. 2.

To avoid the error caused by a single computation, in practice, the input registration utterance 31 of an enrolled speaker 30 is divided into a plurality of segments, each of which is converted into an enrolled speaker embedding vector. Then an average vector of the enrolled speaker embedding vectors is used as the representative vector (prototype vector) 32 of the enrolled speaker 30. Further, when the length of an input registration utterance 31 of an enrolled speaker 30 is insufficient, the speaker identification system duplicates this input registration utterance 31 to increase the length, in order to meet the length requirements.

After completing the enrollment process, the speaker identification system can identify an input test utterance 41 from a test speaker 40 as a spoofing attack, an impostor or a specific enrolled speaker.

Figure 4:
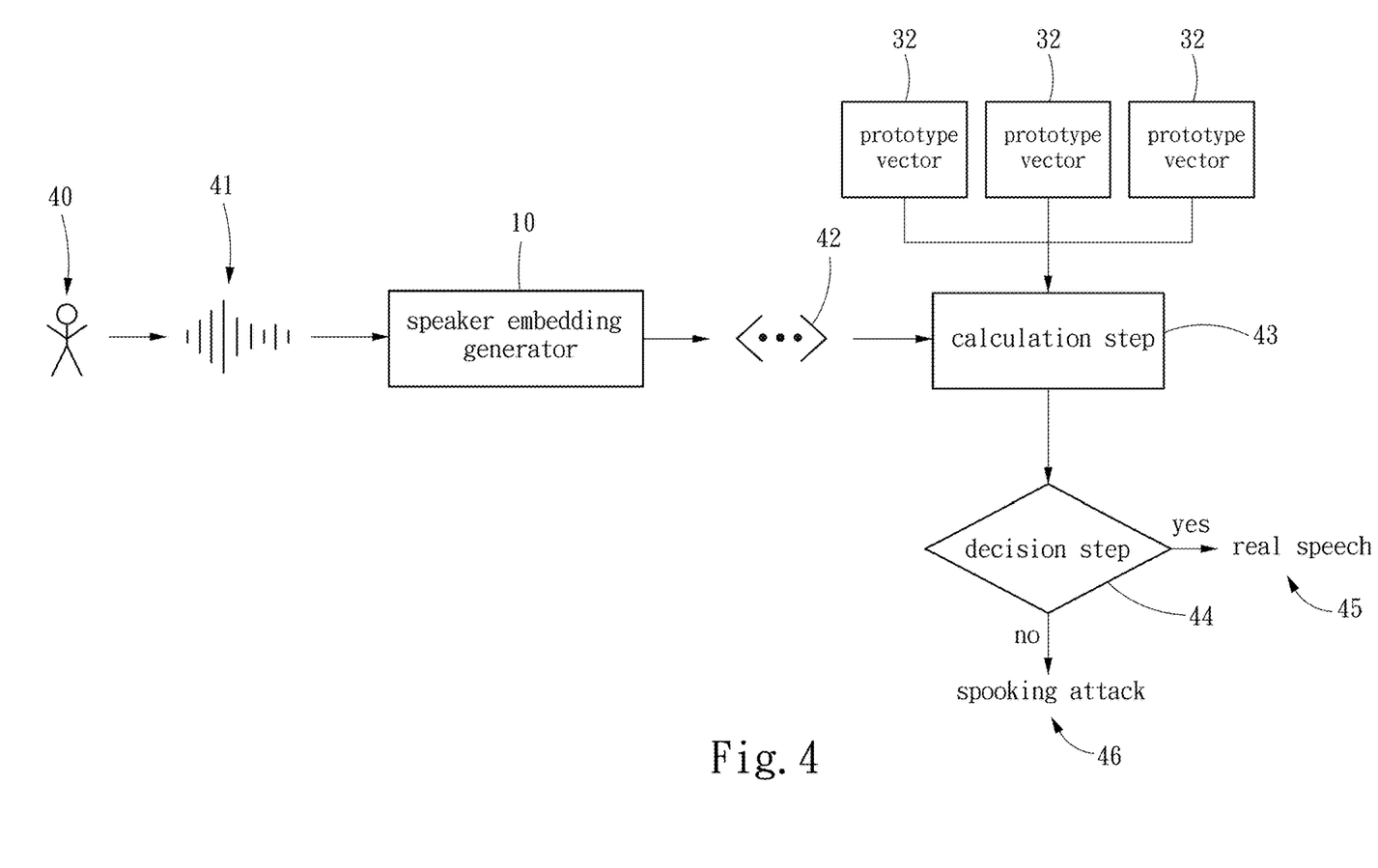
FIG. 4 is a schematic diagram of a spoofing attack identification step of the invention.

Referring to FIG. 4, a spoofing attack detection step is to determine whether an input test utterance 41 of a test speaker 40 is a spoofing attack 46. The speaker identification system first uses the speaker embedding generator 10 to convert the input test utterance 41 into a test embedding vector 42. Then using a calculation step 43, a cosine similarity is computed between the test embedding vector 42 and the prototype vector 32 of each enrolled speaker 30 in the speaker identification system. Next, a decision step 44 determines whether the input test utterance 41 is a real speech 45, or a fake speech (i.e., a replay from a device or a synthesized speech). If cosine similarities computed between the test embedding vector 42 and the prototype vectors of all enrolled speakers 30 exceed a spoofing threshold, the input test utterance 41 produced by the test speaker 40 is determined as the real speech 45; otherwise, it is determined as a spoofing attack 46 and is thus rejected for login.

Further, a cosine similarity between the test embedding vector 42 and the prototype vector 32 of each of K enrolled speakers 30 in the system is calculated by the following formula:

$$\delta_k = \frac{Q \circ P_k}{\|Q\|_2 \times \|P_k\|_2}, \quad k = 1, 2, \ldots, K$$

where $\circ$ denotes the inner product operation, Q represents the test embedding vector 42, and $\{P_k\}_{k=1}^{K}$ includes each prototype vector 32 of all the enrolled speakers 30 in the speaker identification system. The spoofing attack 46 is not the real speech 45 and it may come from replay and speech synthesis and similar methods that reproduce utterances using electronic means. In the case of the spoofing attack 46, the test embedding vector 42 of the input test utterance 41 has a relatively low cosine similarity with the prototype vector 32 of at least one of the enrolled speakers 30. Thus, it is sufficient to determine that the input test utterance 41 is the real speech 45 if all the cosine similarities are greater than the spoofing threshold. On the other hand, it is determined that the input test utterance 41 comes from a spoofing attack if at least one of the cosine similarities falls below the spoofing threshold.

Figure 5:
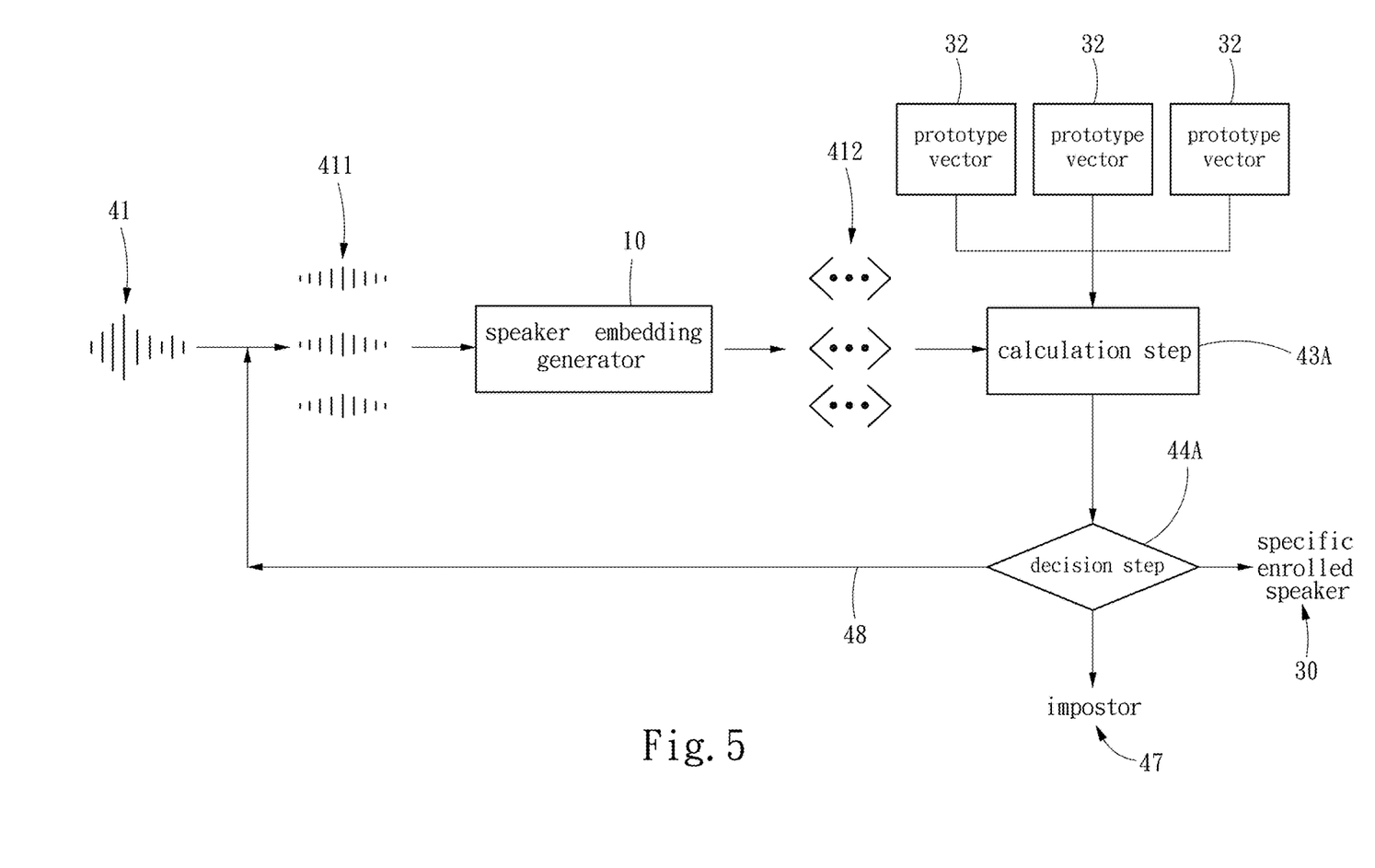
FIG. 5 is a schematic diagram of an impostor and enrolled speaker identification step of the invention.

Whenever the input test utterance 41 is identified as the real speech 45 in the spoofing attack detection step, referring to FIG. 5, an impostor and enrolled speaker identification step is used to determine whether the input test utterance 41 of the test speaker 40 is from an impostor 47 or a specific enrolled speaker 30. In this step, the input test utterance 41 is randomly divided into three segments 411 which are continuous parts of the input test utterance 41. Through the speaker embedding generator 10, the three segments 411 of the test speaker 40 are converted into three segment speaker embedding vectors 412. Then, using a calculation step 43A, a similarity score between each of the segment speaker embedding vectors 412 and the prototype vector 32 of each enrolled speaker 30 in the system is calculated.

Further, the calculation of the similarity score described herein differs from that described in the implementation concerning the step of detecting the spoofing attack mentioned earlier. More specifically, in the impostor and enrolled speaker identification step, the similarity score described herein is scaled by the length of the segment speaker embedding vector. The following formula is used to calculate the similarity score between the segment speaker embedding vector 412 of the ith segment of the three segments 411 and the prototype vector 32 of the kth enrolled speaker 30 in the speaker identification system:

$$\delta_{i,k} = \frac{Q_i \circ P_k}{\|P_k\|_2} = \|Q_i\|_2 \cos\theta_{i,k}, \quad k = 1, 2, \ldots, K,$$

where $Q_i$ represents the segment speaker embedding vector 412, and $\{P_k\}_{k=1}^{K}$ includes each prototype vector 32 of all the K enrolled speakers 30 in the speaker identification system. The angle $\theta_{i,k}$ denotes the angle between $Q_i$ and $P_k$. Furthermore, the K similarity scores $\{\delta_{i,k}\}_{k=1}^{K}$ for each segment $i \in \{1,2,3\}$ are converted into a probability distribution of K similarity probabilities using softmax operation, as follows:

$$p_{i,k} = e^{\delta_{i,k}} / \sum_{k'=1}^{K} e^{\delta_{i,k'}}, \quad k = 1, 2, \ldots, K.$$

Through the above calculation, in each similarity score $\delta_{i,k}$, since the scale $\|Q_i\|_2$ is greater than 1, the similarity score in impostor detection increases by a large factor of $\|Q_i\|_2$. This amplifies the difference in probabilities $\{p_{i,k}\}_{k=1}^{K}$ among the K enrolled speakers, so as to increase the discriminative power.

Then, using a decision step 44A, an identification between impostor and enrolled speaker is performed. When the maximum similarity score among the K similarity scores for each of the three segment speaker embedding vectors 412 of the segments 411 are all greater than an impostor threshold and the three maximum similarity scores correspond to the same enrolled speaker 30, it is referred to as a unanimity vote. In this case, the test speaker 40 is identified as that specific enrolled speaker 30; otherwise, the test speaker 40 is determined as the impostor 47 and is rejected for login.

In the impostor and enrolled speaker identification step, if only two out of the three segment speaker embedding vectors 412 of the three segments 411 have their highest similarity scores greater than the impostor threshold and point to the same enrolled speaker 30 (say enrolled speaker k), it is referred to as a majority vote. Suppose that the remaining segment (say segment i') of the test speaker 40 has the highest similarity score, pointing to a different enrolled speaker 30 (say enrolled speaker k'≠k). Then, for the remaining segment i', the maximum similarity probability is given by $p_{i',k'}$ and the similarity probability with respect to the enrolled speaker k (the enrolled speaker claimed in majority vote) is $p_{i',k}$. Now, the difference $p_{i',k'} - p_{i',k}$ is referred to as a similarity probability gap.

Typically, the impostor threshold is set large enough to prevent, as much as possible, any impostor from breaking into the speaker identification system. However, this may also result in the enrolled speaker 30 being falsely rejected. To prevent such false rejection, the speaker identification system is equipped with an internal retry mechanism. This internal retry mechanism involves randomly re-splitting the input test utterance 41 into three different segments 411 internally, which are again fed for testing. When the unanimity vote does not hold, the internal retry mechanism will be activated for an additional opportunity to repeat the impostor and enrolled speaker identification step if the majority vote holds and the similarity probability gap is smaller than a preset threshold.

Furthermore, in order to increase the blocking rates of the impostor 47, if the enrolled speaker 30 corresponding to the highest cosine similarity in the spoofing attack identification step is different from the enrolled speaker 30 identified through a unanimity vote in the impostor and enrolled speaker identification step, the test speaker 40 is rejected for login.

Figure 6:
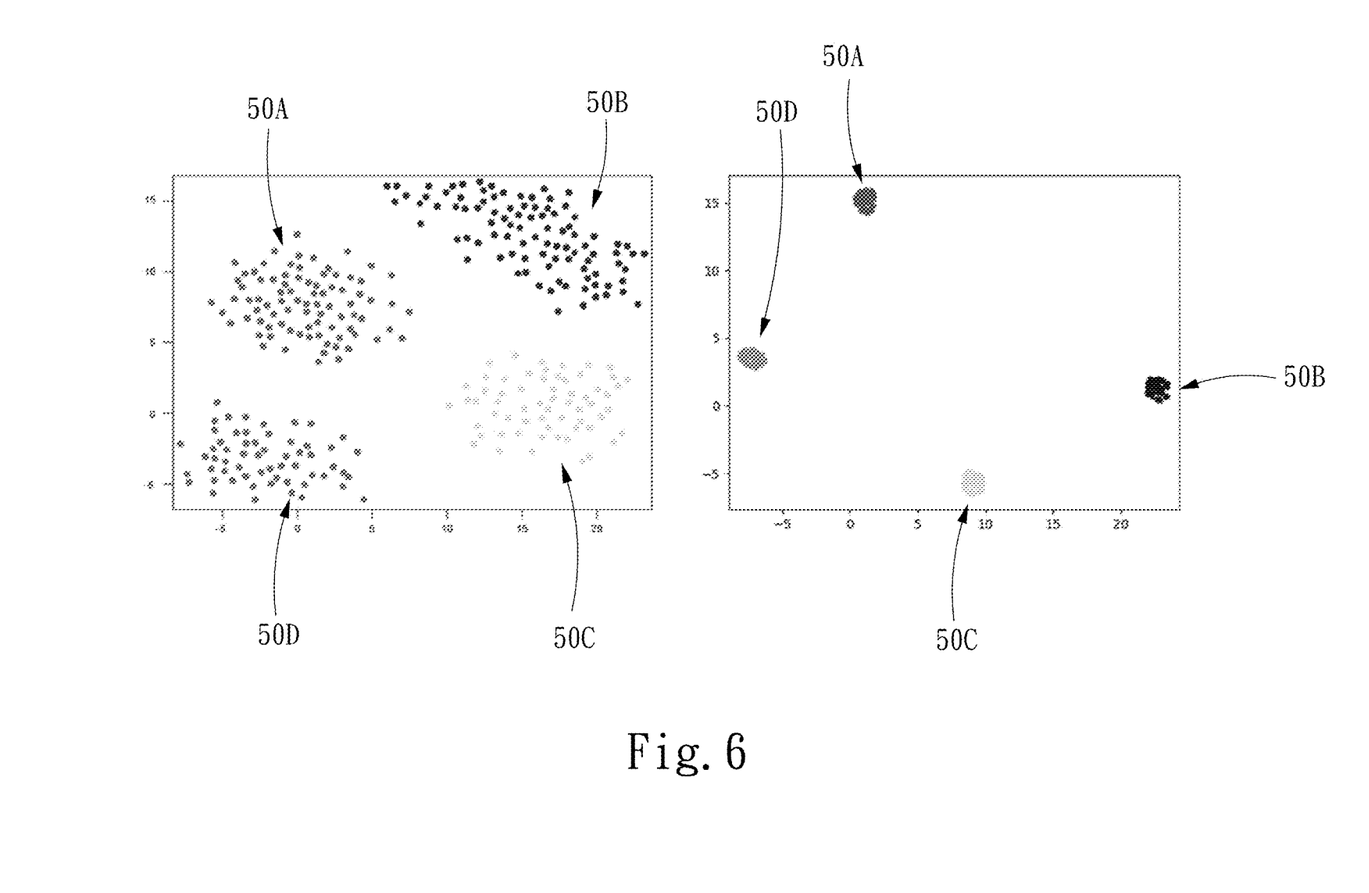
FIG. 6 shows speaker embedding vector distributions of the conventional technology and the invention.

Also referring to FIG. 6, in one embodiment, four speakers are randomly chosen, and their speaker embedding vectors, 50A, 50B, 50C and 50D, are visualized using UMAP projection. Each speaker speaks 60 utterances, with each lasting 3 seconds. In the left portion of FIG. 6, a distribution of conventional speaker embedding vectors (i-vectors) is shown, where the speaker embedding vectors of each speaker are scattered, and the distances between embedding clusters of different speakers are not adequately separated. The right portion of FIG. 6 shows the distribution of speaker embedding vectors generated by the speaker embedding generator of the invention in FIG. 3. It can be observed that the speaker embedding vectors of the same speaker are concentrated in one area, while the speaker embedding vectors of different speakers are sufficiently distant from each other. This indicates that the speaker embedding space learned by the invention can clearly distinguish utterances from different speakers.

In order to illustrate the differential effectiveness of this invention compared to the conventional technology, a comparison will be made in terms of acceptance rate of enrolled speakers 30, blocking rate of impostors 47 and detection rate of spoofing attack 46.

In an experiment to evaluate the acceptance rate of enrolled speakers, five enrolled speakers are recruited. Each enrolled speaker records 20 minutes of speech using the system's microphone. In addition, to evaluate the identification rate for different lengths of test utterances, the 20-minute utterance sample for each enrolled speaker is further divided into three lengths: 1 second, 2 seconds and 3 seconds. Each length category consists of 400 utterances.

In an experiment to assess the impostor blocking rate, 20 unenrolled speakers are recruited as impostors. Each impostor records a 5-minute test speech using the system's microphone. The 5-minute speech of each impostor is also divided into three lengths: 1 second, 2 seconds and 3 seconds. Each length category consists of 100 utterances.

In an experiment to assess the detection rate of spoofing attack, a 5-minute speech of each enrolled speaker is recorded using a reorder. This recorded speech serves as a test corpus for spoofing attacks. The recorded corpus is also divided into three lengths: 1 second, 2 seconds and 3 seconds. Firstly, each speaker's 5-minute corpus is divided into 100 utterances, each of which is 3 seconds long. Then, for each 3-second utterance, consecutive segments of 2-second and 1-second length are randomly selected. Thus, the number of utterances for each length category is 100.

A conventional technology disclosed in Taiwan Publication No. TW 202207209 A entitled "Speaker Identification Method", which is a speaker identification model using i-vectors. The experimental results are compared in the following table. It can be seen that in the case of short utterance (1 second), the proposed invention still achieves significant improvements compared to the prior art.

|  | 1 second | 2 seconds | 3 seconds |
|---|---|---|---|
| Acceptance rate of enrolled speakers of the present invention | 96.85% | 98.13% | 98.46% |
| Acceptance rate of enrolled speakers of the prior art | 75.56% | 77.94% | 80.88% |
| Impostor blocking rate of the present invention | 99.92% | 99.85% | 99.76% |
| Impostor blocking rate of the prior art | 80.13% | 86.95% | 91.62% |
| Detection rate of spoofing attack of the present invention | 99.87% | 99.66% | 99.31% |
| Detection rate of spoofing attack of the prior art | 94.86% | 95.91% | 98.44% |

In summary, the present invention has the following features:
1. Compared with traditional identification methods that rely on multiple classifiers, the present invention enables enrolled speakers to complete system enrollment with a small number of enrollment utterances, eliminating the necessity of training any classifier. As a result, reliable performance can be achieved even with short test utterances. In addition, our model does not require re-training when any existing enrolled speaker is removed or any new speakeris added to the system. In other words, any change to the set of target speakers does not necessitate re-training the model.
2. The single and lightweight speaker model can be applied in open set environments to simultaneously handle the identification of enrolled speakers, detection of spoofing attack and blocking of impostors. Such a lightweight feature not only facilitates implementation on low-cost embedded hardware, but provides real-time response due to its low computational complexity.

What is claimed is:

1. A real-time speaker identification system, utilizing meta learning to process short utterances in an open-set environment, comprising:
    a speaker embedding generator, comprising a speaker model and a Mel-filter bank, the speaker model converting acoustic feature vectors extracted by the Mel-filter bank into a speaker embedding vector, wherein the speaker model is trained with a plurality of episodes based on meta learning with a composite objective function composed of two loss functions, each of the plurality of episodes comprises a support set of long utterances and a query set of short utterances, and gradients of the composite objective function are back-propagated to update the speaker model;
    wherein the speaker identification system converts an input registration utterance of each of a plurality of enrolled speakers into at a prototype vector by the speaker embedding generator to complete an enrollment process, and after the enrollment process is completed, the speaker identification system is provided for each tester to perform the following steps:
    a spoofing attack identification step to determine whether an input test utterance of a tester is a spoofing attack, wherein the spoofing attack identification step comprises converting the input test utterance of the tester into a test embedding vector by the speaker embedding generator, calculating a cosine similarity between the test embedding vector and the prototype vector of each of the plurality of enrolled speakers, and determining whether the cosine similarity between the test embedding vector of the tester and the prototype vector of each of the plurality of enrolled speakers exceeds an impostor threshold, if all the cosine similarities exceed the impostor threshold, the input test utterance of the tester is determined as a real speech; otherwise, the input test utterance of the tester is determined as the spoofing attack, and the tester is rejected for login;
    and an impostor and enrolled speaker identification step to determine whether the input test utterance of the tester is from an impostor or one of the plurality of enrolled speakers, wherein the impostor and enrolled speaker identification step comprising randomly dividing the input test utterance of the tester into three sound segments which are continuous parts of the input test utterance, converting the three sound segments into three segment speaker embedding vectors by the speaker embedding generator, and calculating a similarity score between each of the three segment speaker embedding vectors and the prototype vector of each of the plurality of enrolled speakers, and determining whether the maximum similarity scores of the three segment speaker embedding vectors of the tester all point to a specific enrolled speaker of the plurality of enrolled speakers and are all greater than the impostor threshold, if yes, the tester is determined as that specific enrolled speaker; otherwise, the tester is determined as an impostor and is rejected for login;
    wherein in the impostor and enrolled speaker identification step, a unanimity vote holds when all the three segment speaker embedding vectors have the maximum similarity scores greater than the impostor threshold and point to the same enrolled speaker; the tester is rejected for login if the enrolled speaker with the highest cosine similarity in the spoofing attack identification step is different from the enrolled speaker identified through the unanimity vote in the impostor and enrolled speaker identification step.

2. The real-time speaker identification system according to claim 1, wherein the speaker identification system is configured to divide the input registration utterance of one of the plurality of enrolled speakers into a plurality of segments, convert each segment into a speaker embedding vector, and calculate an average of the speaker embedding vectors to create a prototype vector for that enrolled speaker.

3. The real-time speaker identification system according to claim 2, wherein the speaker identification system duplicates the input registration utterance of one of the plurality of enrolled speakers to increase a length of the input registration utterance to meet a length requirement when the input registration utterance of one of the plurality of enrolled speakers does not hold the length requirement.

4. The real-time speaker identification system according to claim 1, wherein in the impostor and enrolled speaker identification step, among the three segment speaker embedding vectors of the three sound segments, a majority vote holds when only two out of the three segment speaker embedding vectors have the maximum similarity scores greater than the impostor threshold and point to the same enrolled speaker, and a similarity probability gap is determined by subtracting the maximum similarity probability of the remaining segment from the similarity probability with respect to the enrolled speaker identified by the other two segments, and wherein if the majority vote holds and the similarity probability gap is less than a preset threshold, an internal retry mechanism is activated for providing an additional opportunity to repeat the impostor and enrolled speaker identification step.

5. The real-time speaker identification system according to claim 1, wherein in the impostor and enrolled speaker identification step, among the three segment speaker embedding vectors of the three sound segments, if only two out of the three segment speaker embedding vectors have their maximum similarity scores greater than the impostor threshold and point to the same enrolled speaker, and the enrolled speaker corresponding to the highest cosine similarity in the spoofing attack identification step is identical to the enrolled speaker identified by two of the three segment speaker embedding vectors in the impostor and enrolled speaker identification step, an additional opportunity is given to repeat the impostor and enrolled speaker identification step.

6. The real-time speaker identification system according to claim 1, wherein in the impostor and enrolled speaker identification step, a calculation of the similarity score for each of the segment speaker embedding vectors is scaled by a length of that segment speaker embedding vector, and the similarity scores are converted into a probability distribution using softmax operation.

* * * * *